United States Patent [19]

Matthewson et al.

[11] Patent Number: 4,493,421
[45] Date of Patent: Jan. 15, 1985

[54] SIDE-LOADING CONTAINER CHASSIS STORAGE RACK

[75] Inventors: Randall W. Matthewson; Earl H. Benefiel; Ronald A. Brudi, all of Longview, Wash.

[73] Assignee: Brudi Equipment, Inc., Kelso, Wash.

[21] Appl. No.: 429,039

[22] Filed: Sep. 30, 1982

Related U.S. Application Data

[63] Continuation-in-part of Ser. No. 300,261, Sep. 8, 1981, Pat. No. 4,427,117.

[51] Int. Cl.$^3$ .............................................. A47F 7/00
[52] U.S. Cl. ................................... 211/13; 211/195; 296/3; 410/31
[58] Field of Search ............. 211/60 S, 13, 60 R, 211/182, 192, 193, 195, 207; 410/31, 32, 33, 34, 35, 36, 37, 38, 39, 40, 41, 42, 43, 44, 45, 46, 47, 48; 296/3; 248/544

[56] References Cited

U.S. PATENT DOCUMENTS

| | | | |
|---|---|---|---|
| 1,280,512 | 10/1918 | Macomber | 410/16 |
| 1,978,287 | 10/1934 | Thomas | 410/16 |
| 2,129,950 | 9/1938 | Loney | 410/43 |
| 2,449,491 | 9/1948 | Liebegott | 410/38 |
| 2,486,125 | 10/1949 | Cunnington | 410/40 |
| 2,567,328 | 9/1951 | Fahland | 410/43 |
| 3,184,207 | 5/1965 | Hermanns et al. | 211/182 X |
| 3,613,914 | 10/1971 | Jaekle et al. | 414/391 |
| 3,677,193 | 7/1972 | Pringle | 410/5 |
| 3,752,085 | 8/1973 | Venditty | 410/6 |
| 3,872,983 | 3/1975 | Chapman | 410/6 |
| 4,171,077 | 10/1979 | Richards, Jr. | 211/18 X |
| 4,319,791 | 3/1982 | Gibson | 248/544 X |

FOREIGN PATENT DOCUMENTS 466850  9/1928  Fed. Rep. of Germany ........ 211/17

OTHER PUBLICATIONS

4"×6" Color Photograph of Multi-Sort, Inc., Portland, Oregon, Container Chassis Rack, Taken Jun. 1981.
Container News, May 1981, pp. 9, 10 and 17.

*Primary Examiner*—J. Franklin Foss
*Assistant Examiner*—David L. Talbott
*Attorney, Agent, or Firm*—Klarquist, Sparkman, Campbell, Leigh & Whinston

[57] ABSTRACT

A side-loading rack for storing wheeled container chassis in a nearly vertical, slightly leaning position has a framework of dividers defining plural vertical slots open on one or both sides for receiving a container chassis sideways in each slot. Each divider includes a chassis support arm which extends front to rear along an upper side of each slot. A wheel support on one side of each divider is positioned in a lower part of each slot to support the wheels of a container chassis so that the chassis frame leans at a small angle from vertical against the chassis support arm of an adjacent divider. Corner castings are positioned at opposite ends of the rack so that it can be handled in the same manner as a container. The dividers of one embodiment are constructed with an upper portion, including the chassis support arms, either removable from or collapsible into the lower portion of the frame means to form a more compact structure for ease of handling. In the first embodiment, the wheel support is a cradle-like structure. The dividers of a second embodiment include opposed support surfaces inclined downwardly toward the center of the slot to support the wheels on one divider and the rear end of the chassis on the other divider. The foundation is arranged safely to provide added support to the rear end and includes lengthwise end extensions to form an extra slot between the ends of two abutting racks.

9 Claims, 9 Drawing Figures

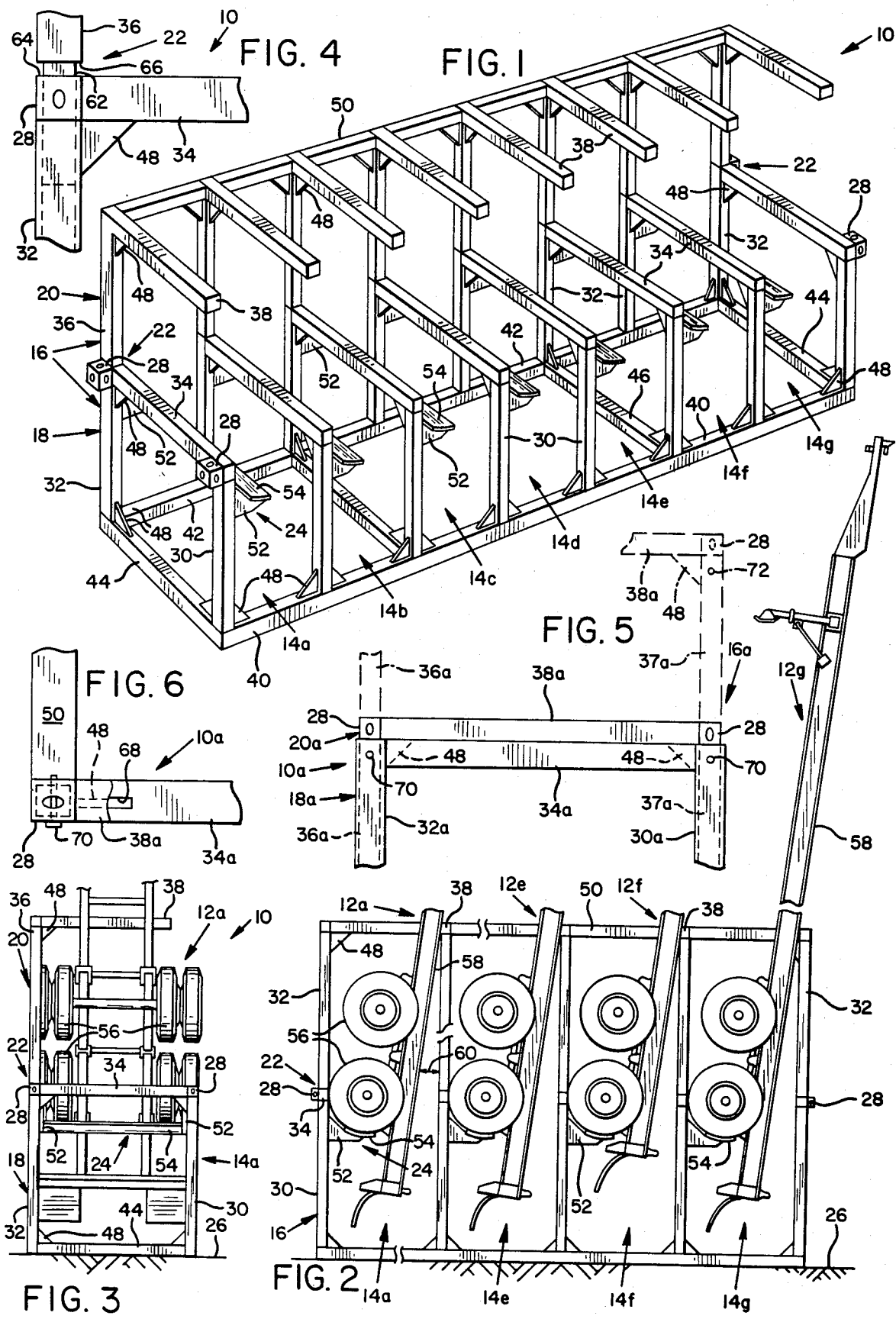

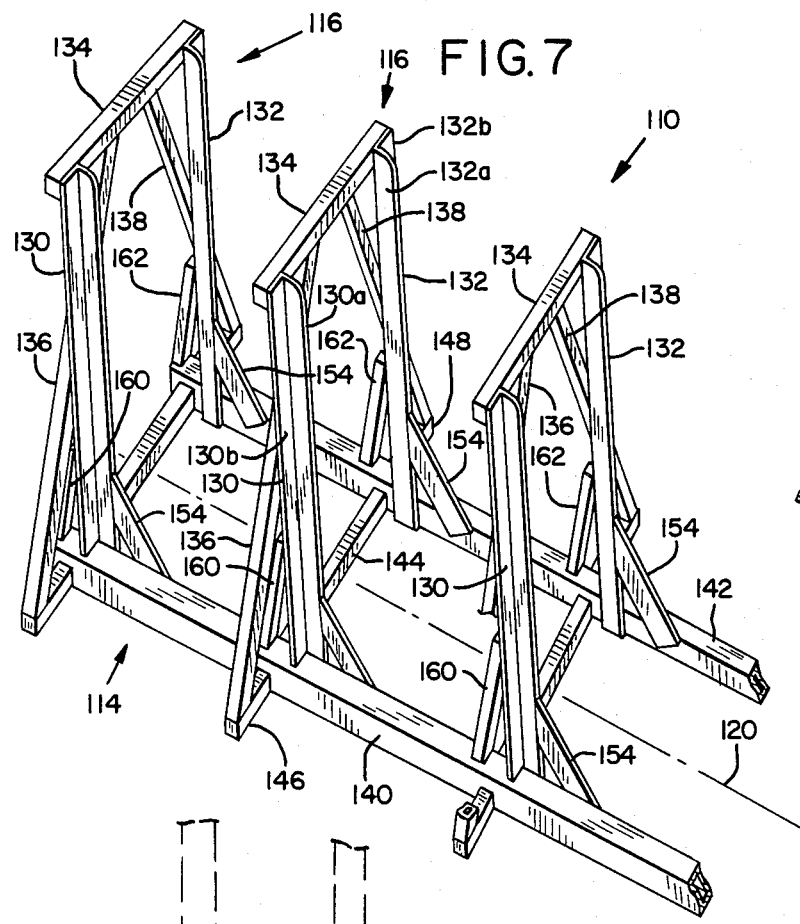
FIG. 7
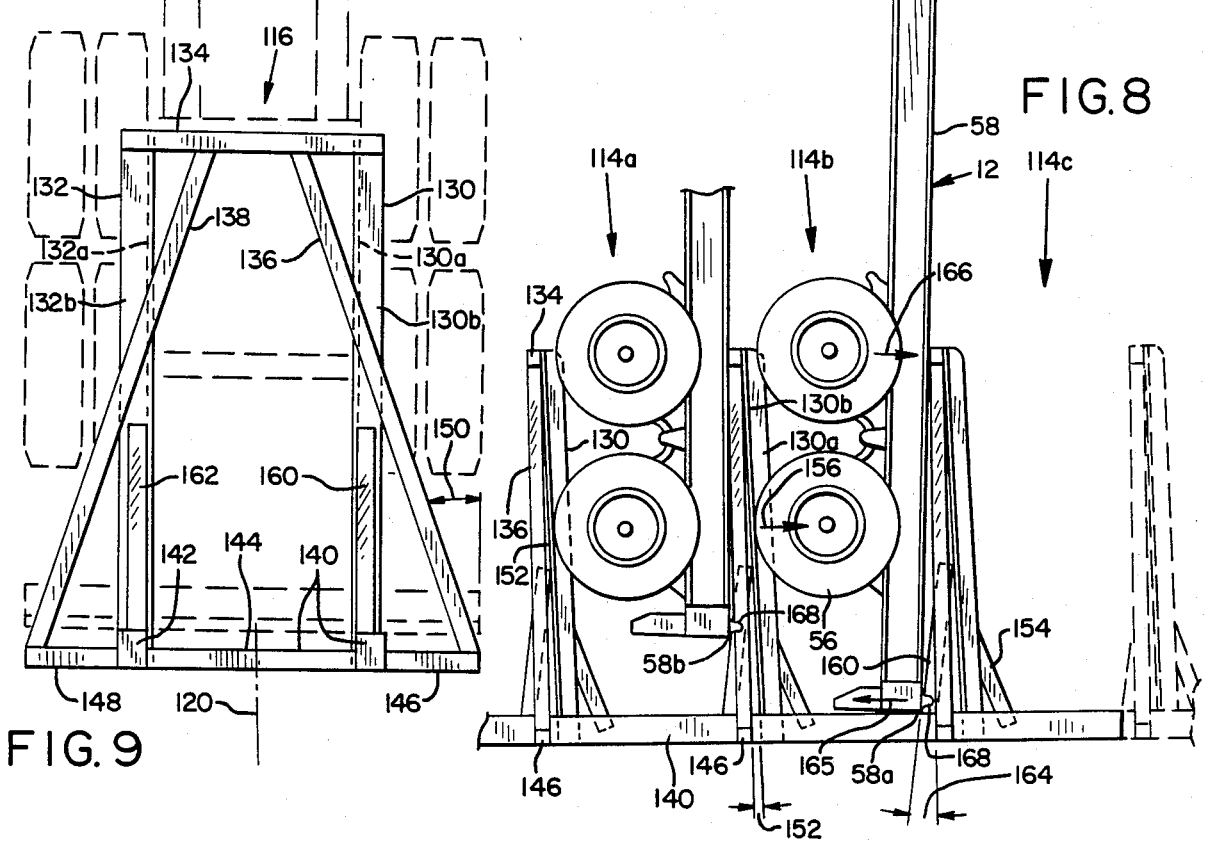
FIG. 8
FIG. 9

SIDE-LOADING CONTAINER CHASSIS STORAGE RACK

This is a continuation-in-part of our commonly-assigned, copending application Ser. No. 300,261, filed Sept. 8, 1981, now U.S. Pat. No. 4,427,117, issued Jan. 24, 1984.

BACKGROUND OF THE INVENTION

This invention relates generally to structures for supporting vehicles and more particularly to racks for storing wheeled container chassis.

Container chassis are used to transport large truck-sized shipping containers. Such containers are used for packaging cargo for easy handling and transportation by ship, truck or rail. The containers are rectangular units which are typically 8 to 9.5 feet high and from 20 to 45 feet in length. Mounted on the upper and lower corners of the containers are ISO (International Standards Organization) corner castings. The containers are handled by lift trucks provided with hoisting attachments including twistlock devices adapted to engage the corner castings at opposite ends of the containers. Examples of such containers and lift trucks are disclosed on pages 9 and 17 in "Container News" of May 1981.

For transportation by truck, the containers are positioned on a wheeled container chassis, examples of which are disclosed on page 10 of the aforementioned magazine. The container is held in place by twist lock devices which protrude upwardly from the top of the chassis to engage the corner castings.

Since container chassis are very large, approximately 45 feet in length, their storage can be a problem. If much storage space is available, each chassis can be stored in a generally horizontal position with its wheels on the ground. However, this manner of storage is impractical in areas, such as seaports and railroad yards, where large numbers of the chassis accumulate and in which storage space is scarce.

In order to reduce the storage space requirements of container chassis, several methods of stacking have been devised. To one method, the container chassis are stacked horizontally one atop the other, with their wheels down. However, because stacking in this manner is unstable, only three chassis can be placed safely in a single stack. In an attempt to increase the number of chassis which can be stacked in a limited area, another stacking method calls for turning every other chassis in the stack upside down. In this way, as many as five chassis can be stacked safely. However, conventional methods of flipping the chassis upside down frequently damage the chassis. Moreover, both of the foregoing stacking methods cause uneven utilization of the stacked chassis. Because the first chassis in the stack is at the bottom of the stack and therefore less accessible, it is less likely to be used than the chassis at the top of the stack.

In an attempt to overcome some of the deficiencies of the foregoing stacking methods, Multi-Sort, Inc. of Portland, Oreg., devised a rack for stacking container chassis in an approximately vertical position. In top plan view, this rack has a generally U-shape with an opening at one end of the rack. A series of horizontally pivoting arms are mounted along one side of the rack and at the top thereof. A container chassis is positioned in the rack by hoisting it into a vertical position with a lift truck and moving it wheels first into the open end of the rack. The chassis is then placed in the rack with its rear end resting on the ground and the underside of its frame resting against the closed end of the rack. The first pivot arm is then swung across the rack and latched into position so that another container chassis can be leaned against it.

This method of storage reduces the storage area required by the container chassis, but has several drawbacks. First, like the aforementioned ground stacking systems, this rack provides a first in, last out storage system, resulting in uneven utilization of the chassis. Second, it requires a special lift truck attachment designed so that the lift truck approaches an empty chassis from its rear end. The attachment is titlted down to grasp the chassis along opposite sides of its frame and then tilted back up to lift the chassis into an upright position. A third disadvantage of this rack is the difficulty in storing the container chassis on the ground. The rear end of the chassis frame is provided with rear taillights and other breakable parts. If the chassis is stood on its rear end on the ground, these parts are susceptible to damage. The chassis wheels can be rested on wheel chocks, but the chocks must be removed from the empty storage positions in order to provide free access for the lift truck into the rack. Finally, efficient use of this rack requires two people, one to operate the lift truck and the other to manipulate the wheel chocks and horizontally-pivoting arms. Otherwise, the operator of the lift truck must get off the lift truck to perform these steps each time a chassis is placed in or removed from the rack.

It would be preferable to be able to stack the container chassis so that the first chassis stored can be the first chassis removed from storage for use, thereby enabling more uniform utilization of all the stored chassis. It would also be preferable to be able to handle empty container chassis by means of lift truck apparatus adapted for approaching and engaging the chassis along one side so that the need for special chassis-handling apparatus is minimized. Ideally, the stacking system should also require only one person to perform all steps in the storage process from the seat of a lift truck.

A variety of storage systems for automobiles are known. U.S. Pat. Nos. 1,280,512 to Macomber and 1,978,287 to Thomas disclose frame structures inclined at 20°-40° angles for supporting automobiles in a railroad car. To prevent rolling, the wheels of the automobiles are secured in a cradle by chain. U.S. Pat. No. 3,677,193 to Pringle discloses a railroad car in which automobiles are stored on their side, supported along a wall by brackets connected to the underside of their chassis. U.S. Pat. Nos. 3,613,914 to Jaekle, et al.; 3,752,085 to Venditty and 3,872,983 to Chapman disclose railroad cars designed to support automobiles on end, supported on tiltable sidewalls of the freight cars by brackets connected to the underside of the chassis of the automobiles.

However, none of the foregoing patent discloses means for solving the above-described problems connected with the storage of wheeled container chassis. In particular, none of these patents discloses a storage apparatus into which a container chassis could be loaded sideways. Nor do they disclose means for supporting a container chassis vertically above ground level without positive securement.

Accordingly, there remains a need for an improved arrangement for storing wheeled container chassis.

SUMMARY OF THE INVENTION

One object of the invention is to provide an improved storage arrangement for wheeled container chassis.

A second object is to enable container chassis to be stored in a vertical position above the ground without positive securement.

A third object is to store multiple container chassis so that they can be used in a first-in, first-out or any other desired sequence.

Another object of the invention is to enable a single person to store container chassis without assistance and without risk of damage to the container chassis.

A further object is to minimize the area required for storage of container chassis.

Yet another object is to store container chassis in a way that is compatible with the machinery customarily used for handling containers and container chassis.

To meet the foregoing objects, one broad aspect of the invention provides for a side-loading rack for storing wheeled container chassis in a nearly vertical, slightly leaning position, the rack comprising structural or frame means defining plural vertical slots or stalls open on one or both sides for receiving a container chassis sideways in each slot. Another broad aspect of the invention is a chassis-storage rack having a frame means arranged to provide plural stalls, each stall comprising first support means for supporting rear wheels of the chassis above ground level and second support means for supporting the chassis frame forwardly of the wheels so as to maintain the chassis in a generally upright position.

The invention is illustrated in two embodiments. In both embodiments, the second support means is provided by a fixed chassis support member extending front to rear along an upper side of each slot for supporting the chassis frame at a position above the rear wheels.

In one embodiment, the first support means is provided by a cradle-type wheel support means positioned on the frame means in a lower part of the slot so that a container chassis is supported therein with its wheels resting on the wheel support means on one side of the slot. In this embodiment, the wheel support means can provide the sole vertical component of force to support the chassis with its rear end spaced from the rack frame means. The upper side of the chassis frame leans against the chassis support member on the other side of the slot above the wheel support means, preferably at a small angle from vertical, the wheel support means providing a lateral component of force on the rear wheels to support the chassis in a nearly upright position.

In the second embodiment, the frame means includes a third support means in each slot for supporting the chassis frame below the rear wheels. To provide such third support means, the frame means is preferably angled inwardly in a downward direction from vertical on both sides of the slot so as to apply vertical and oppositely-directed lateral force components to the rear wheels and the rear end of the chassis frame as the chassis is lowered into the slot. The weight of the chassis is thereby vertically supported jointly by the first and third support means. The lateral force component provided by the third support means urges the wheels laterally against the first or wheel support means and, being positioned below the first support means, tends to tilt the chassis frame to a leaning position against the chassis support. The third support means is arranged so that the rear end of the chassis frame can rest on the frame means at or near the bottom of the slot without damage to taillights.

The rack can be constructed for handling in the same manner as a container, using conventional container-handling apparatus to engage corner castings positioned at opposite ends of the rack. The frame means can be constructed with an upper portion, including the chassis support arms, either removable from or collapsible into the lower portion of the frame means to form a more compact structure for easy handling. The base of the frame means can also include a lengthwise extension at one end of the rack for spacing the rack end to end from a second such rack to form an additional slot between the two racks.

The foregoing and other objects, features and advantages of the invention will become more apparent from the following detailed description of a preferred embodiment of the invention, which proceeds with reference to the accompanying drawing.

BRIEF DESCRIPTION OF THE DRAWING

FIG. 1 is a perspective view of a first embodiment of a side-loading container chassis storage rack in accordance with the invention.

FIG. 2 is a front elevational view of end portions of the rack of FIG. 1 with a container chassis standing in each slot of the rack.

FIG. 3 is a side elevational view of the left end of the rack of FIGS. 1 and 2.

FIG. 4 is an enlargement of a portion of the view of FIG. 3 showing one mode of interconnection of the upper and lower portions of the rack.

FIG. 5 is an enlarged side elevational view of the left end of a variation of the first embodiment of a rack in accordance with the invention showing the upper portion of the rack telescoped into the lower portion in solid lines and raised in phantom lines.

FIG. 6 is a top plan view of a corner portion of the rack of FIG. 5.

FIG. 7 is a perspective view of a second embodiment of a chassis storage rack in accordance with the invention.

FIG. 8 is a front elevational view of the right end portion of the rack of FIG. 7, the left end of a second such rack being shown in phantom lines in abutment with the right end thereof.

FIG. 9 is a side elevational view of the left end of the rack of FIG. 7.

DETAILED DESCRIPTION OF PREFERRED EMBODIMENTS

Embodiment of FIGS. 1-4

Referring to FIGS. 1-3, a side-loading rack 10 for storing a number of wheeled container chassis 12 in narrow, relatively tall separate slots or stalls 14 comprises structural frame means defining a series of laterally spaced-apart dividers 16. The frame means is constructed of suitable structural members, such as steel square or rectangular tubular members, welded together at their joints. Each of the dividers has a lower portion 18 and an upper portion 20 joined by interconnection means 22. A wheel support means 24 for supporting a chassis by its rear wheels is mounted on the lower portion of each divider on one side of the slot at a position spaced above the ground 26. Pairs of ISO corner castings 28 are mounted on the upper corners of the lower portions of the dividers at each end of the rack. When the upper portions of the dividers are removed or collapsed into the lower portions, as further described hereinafter, the corner castings enable the empty storage rack to be handled and transported in the same manner as a container.

By using eight dividers 16, seven storage slots 14 are created in the ground space that would otherwise be occupied by a single container chassis in a horizontal position. Longer or shorter racks may be used. However, for convenience in handling with conventional container-handling equipment, a rack of seven slots is preferred.

The lower portion of each divider 16 comprises parallel front and rear upright members 30, 32 interconnected at their upper ends by a horizontal member 34. The aforementioned corner castings are mounted along the outer ends of the rack at the corners formed by members 30, 34 and 32, 34 respectively. The upper portion of each divider is an inverted L-shaped member which comprises an upright member 36 connected by the interconnection means 22 as an upward extension of member 32 and supporting a cantilevered support arm 38 which extends forwardly above member 34 in spaced-apart parallel relationship.

A pair of spaced-apart, parallel, horizontal foundation members 40, 42 extend along the front and rear sides of the rack to interconnect the lower ends of upright members 30, 32, respectively. A pair of end foundation members 44 interconnect the ends of the front and rear foundation members and the lower ends of upright members 30, 32 at each end of the rack. Two additional cross members 46 extend at intervals between the front and rear foundation members parallel to end members 44. Triangular gussets 48 are secured in the corners between the various vertical and horizontal members to rigidify the rack and to support the cantilevered support arms 38. Horizontal cross members 50 interconnect the upper ends of upright members 36.

Each wheel support 24 comprises a pair of generally triangular support members 52 connected to the upright members 30, 32 so as to protrude from left to right, as viewed in FIGS. 1 and 2, part way into each slot. Secured to the upper sides of triangular support members and extending horizontally therebetween, is an elongated wheel support plate 54. Its upper side is concavely curved about an axis extending from front to rear in the rack for cradling the rearmost wheels 56 of a container chassis resting thereon. The wheel supports 24 are positioned far enough above the ground so that container chassis with elongated rear ends of varying lengths do not contact the ground. They are also spaced below and extend to the right of the horizontal members 34 to which they are connected so that wheels 56 abut such members along a horizontal line passing approximately through the axles of the wheels. The horizontal members thereby limit how far the wheels can roll toward the left.

The upper surface of the container chassis frame 58 leans against the left side of the upper support arm 38. The upper support arm is positioned diagonally across the storage slot from the wheel support means so that frame 58 leans at a small angle 60 from the vertical. Angle 60 is preferably less than about 10° so that most of the weight of the chassis rests on the wheel support means, but great enough so that a leftward horizontal force component acting on wheel support 24 prevents wheels 56 from rolling off the support.

Referring to FIG. 4, connection means 22 is provided by a downward extension 62 of member 36 sized to slide inside member 32, which has a complementary opening 64 in its upper end. Upright members 32, 36 preferably have the same width. Accordingly, the lower end of member 36 forms a shoulder 66 which abuts the top of member 32 when extension 62 is inserted to its full length in member 32.

In one example, a storage rack 10, dimensioned for storing up to seven container chassis of approximately 45 feet in length, is 40 feet long. The upper surfaces of the upper support arms 38 are 16 feet off the ground. The upper surface of plate member 54 of the wheel support means are about 6 feet off the ground and the upper surface of the horizontal members 34 is about 8 feet off the ground. The width of each slot is approximately 5 feet. These dimensions yield a preferred angle 60 of about 8°.

Embodiment of FIGS. 5–6

Referring to FIG. 5, rack 10a has its connection means arranged so that the upper portions 20a of the dividers 16a telescope into the lower portions 18a. In this variation of the first embodiment, upper vertical member 36a is sized along its entire length to fit inside member 32a. A second upper vertical member 37a is connected to the front end of support arm 38a and is likewise sized to telescope into member 30a. The corner castings 28 are mounted within the corners between members 36a, 38a and 37a, 38a of the upper portion of the endmost dividers, rather than on the outer sides of the lower portion of the endmost dividers. Slots 68 are provided in the upper surface of each member 34a in position to allow the triangular gussets members 48 to extend downwardly inside members 34a when the upper portion of the dividers are lowered to rest on the lower portions.

Pins 70 extend horizontally through the upper ends of members 30a, 32a and through complementary holes in members 36a, 37a at two alternative vertical locations. The uppermost holes 72 are located near the upper ends of members 36a, 37a so that pin 70 will extend therethrough when the upper portions of the dividers are lowered into the lower portions. The pins can thus lock the upper portions in a lowered position so that the entire rack can be picked up by a container-handling device engaging the corner castings. The lower holes (not shown) are positioned just above the lower ends of members 36a, 37a so that pins 70 can extend therethrough to secure the upper portions of the dividers in a vertically-extended position when the rack is to be used for storing container chassis.

Operation of First Embodiment

Racks 10, 10a are transported in a collapsed condition, that is, with the upper portions of the dividers either removed from or telescoped into the lower portions. For conventional truck and rail transportation, the overall height of the collapsed rack should be less than 9.5 feet. At its destination, each rack is moved around by conventional container-handling apparatus. When positioned for use to store the container chassis, the right end of the rack should be about 5 feet away from any wall or building. Of course, multiple racks can be placed in end-to-end or back-to-back abutting relationship.

Rack 10 is assembled by inserting the extensions 62 of members 36 into members 32. Rack 10a is assembled by removing pins 70, raising the upper portions 20a using the container handling apparatus, and reinserting the pins in the lower holes in members 36a, 37a.

To store a container chassis in either rack, the chassis is lifted from the ground and rotated from horizontal to an approximately vertical position, with its rear wheels at least as high as the wheel support means 24. This operation is performed by a rotating attachment on a lift truck which grasps the chassis from one side. The container chassis is then moved sideways in a direction from front to rear in the rack into one of the empty storage slots. When the rear wheels 56 of the chassis are vertically aligned with the wheel support means, the chassis is gently lowered until its rearmost wheels rest on the wheel support plate 54. Once the wheels contact the wheel support plate, the chassis frame 58 is tilted backwards, pivoting on the rear wheels, to lean gently against the associated support arm 38. To remove a chassis from the rack, the foregoing steps are reversed.

Embodiment of FIGS. 7-9

Referring to FIG. 7, a second embodiment of the invention is realized in rack 110. Rack 110 is designed to provide slots or stalls 114 defined by dividers 116 which are relatively shorter in height than dividers 16 in rack 10, and which are accessible from both sides of the rack for loading and unloading container chassis 12. In general, each of the dividers is identical in construction and the rack 110 is symmetrical about a longitudinal centerline 120, as best seen in FIG. 9.

Each of the dividers comprises a pair of parallel, spaced-apart, horizontally opposed, upstanding angle members 130, 132 interconnected at their upper ends by a horizontal square tubular support arm 134. Angle members 130, 132 are mutually positioned in mirror image relationship with inner flanges 130a, 132a parallel to one another and extending in the same longitudinal direction and outer flanges 130b, 132b oppositely directed in the same normal to centerline 120.

At their lower ends, upright members 130, 132 of each divider are secured, respectively, to one of a pair of parallel, horizontal rectangular tubular base members 140, 142 extending lengthwise of the rack parallel to centerline 120 to interconnect the dividers at spaced intervals, for example, about 57", to form the slots. Members 140, 142 are spaced apart a distance such that the treads on the tires of the inner rear wheels 56 of chassis 12 are aligned with and can ride along outer flanges 130b, 132b of members 130, 132, with the inwardly facing sidewalls of such tires along the outside of and guided by flanges 130a, 132a. This spacing, for example, 46", between base members 140, 142, positions such members inwardly of the customary position of taillights on the rear end cross member 58a of chassis 12 so that the chassis can rest on such base members above ground level without damaging the taillights.

Support arm 134 is secured to the upper ends of members 130, 132 along the outside faces of flanges 130b, 132b. Square tubular base cross members 144 extend horizontally between longitudinal base members 140, 142 in vertical alignment beneath cross members 134 and have extensions 146, 148 projecting laterally beyond the longitudinal base members to provide a base support for the lower ends of lateral brace members 136, 138. Brace members 136, 138 are affixed at their upper ends to support arms 134 inwardly of the upper ends of uprights 130, 132, to provide principally lateral bracing but also some longitudinal bracing for the uprights. Braces 136, 138 angle inwardly from their bases at an angle 150 (for example, about 19°) from vertical, as is best seen in FIG. 9.

Upright members 130, 132 are inclined lengthwise of the rack at a slight angle 152 (for example, about 1.6°) from vertical toward support arm 134, as best seen in FIG. 8. The slight angle between members 130, 132 and members 136, 138 provides some additional longitudinal bracing for the dividers. Additional longitudinal bracing is provided by short flat bracing members 154 or triangular gussets (not shown) extending between upright members 130, 132 and base members 140, 142 and connected to the inner faces of the base members and the edges of flanges 130a, 132a.

A pair of square tubular members 160, 162 extend at a small vertical angle 164 (for example, about 8°) between the outer flanges 130b, 132b of angle members 130, 132 and longitudinal base members 140, 142 and are connected at their opposite ends to the latter members. Also, the lower ends of members 160, 162 are spaced lengthwise of the rack a sufficient distance, for example, about 4", from members 136, 138 to avoid interference with twist locks 168 at the rear corners of the chassis frame 158 when resting on members 140, 142.

OPERATION OF SECOND EMBODIMENT

Rack 110 requires no special assembly or disassembly for shipping or use. It is preferably positioned end to end with another rack 110a to form an extra slot 114c and not back to back with another rack, as with racks 10, 10a, to provide chassis loading and unloading access from both sides of the rack.

Loading and unloading of chassis from rack 110 is performed in generally the same way as in racks 10, 10a. That is, a chassis is lifted up, rotated, moved sideways into a slot 114 and lowered into the slot until it is supported by the rack. However, in loading a chassis into a slot 114, the chassis should be centered in the rack with the inner flanges 130a, 132a along the inner sidewalls of the chassis wheels 56. These flanges laterally stabilize the chassis to hold it upright. This feature is particularly important when the chassis frame has a short tail end 58b which does not rest on the foundation members 140, 142, as illustrated in slot 114a in FIG. 8.

When the chassis is lowered into the slot, it is guided by various elements of the structure of the slot into a position in which it is supported by the rack. When contacted by rear wheels 56 during lowering of the chassis, angled members 130, 132 urge the wheels and rear end portion of chassis 12 longitudinally of the rack, or laterally toward the opposite side of slot 114, as indicated by arrow 156. The tail end 58a of chassis frame 58 thereupon slidingly engages the oppositely-inclined members 160, 162 to urge such end laterally of the slot toward members 130, 132, as indicated by arrow 165 in FIG. 8. This action combines with the urging by flanges 130b, 132b of wheel 56 in the opposite direction 156 to tend to rotate the chassis frame about the axle of wheel 56 against support arm 134, as indicated by arrow 166, and to squeeze the wheels 56 against angle members 130, 132 to help support the chassis. In the case of a long-tailed chassis, as shown positioned in slot 114b, the rear cross member 58a ultimately comes to rest on and is supported by the base members 140, 142. In the case of a short-tailed chassis, as shown positioned in slot 114a, the rear cross member 58b is supported by inclined members 160, 162 above the base of the rack, due to an interaction of opposite lateral supporting forces exerted on the chassis by inclined members 130, 132 and 160, 162.

Having illustrated and described two embodiments of our invention, and the operation thereof, those skilled in the art should appreciate that the invention can be modified in arrangement and detail without departing from its principles. Accordingly, we claim all modifications and variations coming within the spirit and scope of the following claims.

We claim:

1. A side-loading rack for storing wheeled container chassis having an elongated chassis frame projecting forwardly from rear, ground-engaging wheels, the rack comprising:

rack frame means defining a plurality of stalls, including first and second upright frame means spaced laterally apart to define a side of each stall and to form an opening on one side of the rack for receiving a container chassis sideways in a generally vertical orientation;

a first chassis support means at one side of each stall for supporting the rear wheels of the chassis on the first frame means above ground level;

a second chassis support means at the opposite side of each stall and at a level spaced above the first support means for supporting a forwardly-projecting portion of the container chassis frame in a generally upright position with the wheels of the chassis supported against the first support means; and a third chassis support means at said opposite side of each stall and at a level below said first chassis support means for supporting a rear end portion of said chassis when said rear wheels and said forwardly-projecting portions of said chassis are supported, respectively, against said first and second chassis support means.

2. A rack according to claim 1 in which the first chassis support means comprises a means defining an upright first support surface in the rack frame means on said one side of each stall for providing a first lateral component of supporting force against said rear wheels in a direction toward said opposite side of the stall and the third chassis support means comprises means defining a second support surface in the frame means inclined so as to provide a second lateral component of supporting force against said chassis rear end portion in a direction toward said one side of the stall, so as to maintain the chassis generally upright without positive securement.

3. A rack according to claim 2 in which the first support surface extends laterally a distance toward the opposite side of the stall to provide a first vertical component of force against the rear wheels, the third support means providing a second vertical component of force, so that support of the weight of the chassis is divided between the first and third support means.

4. A rack according to claim 1 in which the first and third support means comprise a pair of opposed generally upright support members spaced on opposite sides of the stall and downwardly inclined toward one another.

5. A rack according to claim 1 in which said first chassis support means includes means for engaging a side of said wheels to laterally stabilize and center the chassis in the rack.

6. A rack according to claim 1 in which both sides of the rack include means defining an opening into each slot for inserting a chassis sideways into the slots from either side of the rack.

7. A rack according to claim 1 in which the rack includes lengthwise base means for supporting a rear end of the chassis frame above ground level, the base means being laterally positioned so that any breakable components of said rear end are protected from damage.

8. A rack according to claim 1 in which the rack includes lengthwise base means having an end portion extending a predetermined distance past an end one of said upright frame means for spacing said rack end to end from a second said rack to form an extra one of said slots between the racks.

9. A method of supporting for storage a wheeled container chassis having an elongated chassis frame having laterally spaced longitudinal side frame members forwardly of rear ground-engaging chassis wheels including a pair of rearmost wheels coaxially mounted on a lower side of the laterally spaced longitudinal side frame members of the chassis, the method comprising:

orienting the chassis in a generally vertical attitude with its frame projecting upwardly from the wheels;

exerting a first supporting force radially against the rearmost wheels of the chassis;

exerting a second supporting force against an upper surface of the laterally spaced longitudinal side frame members of the chassis forwardly of the rearmost wheels at a level above the point of application of the first supporting force; and exerting a third supporting force against a rear end portion of the trailer frame at a point below the point of application of the first supporting force;

said second and third forces being applied in a direction opposite the first force so as to maintain said generally vertical attitude without positive securement.

* * * * *

UNITED STATES PATENT AND TRADEMARK OFFICE
CERTIFICATE OF CORRECTION

PATENT NO. : 4,493,421

DATED : January 15, 1985

INVENTOR(S) : Randall W. Matthewson; Earl H. Benefiel; Ronald A. Brudi

It is certified that error appears in the above-identified patent and that said Letters Patent is hereby corrected as shown below:

Column 1, line 44, "To" should be --In--;
Column 2, line 48, "chain" should be --chains--;
Column 2, line 58, "patent" should be --patents--;
Column 6, line 64, before "wall" insert --tall--;
Column 7, line 39, before "normal" insert --plane--.

Signed and Sealed this

Twenty-fifth Day of June 1985

[SEAL]

Attest:

DONALD J. QUIGG

Attesting Officer    Acting Commissioner of Patents and Trademarks